United States Patent [19]

Colvin et al.

[11] Patent Number: 4,739,036
[45] Date of Patent: Apr. 19, 1988

[54] RUBBER VULCANIZATION AGENTS AND METHODS FOR THEIR PREPARATION

[75] Inventors: Howard A. Colvin, Tallmadge; Charles L. Bull, Jr., Akron, both of Ohio

[73] Assignee: Goodyear Tire & Rubber Company, Akron, Ohio

[21] Appl. No.: 896,688

[22] Filed: Aug. 15, 1986

[51] Int. Cl.$^4$ ............................................... C08G 75/00
[52] U.S. Cl. ................................ 528/389; 106/287.32
[58] Field of Search .................... 106/287.32; 528/389

[56] References Cited

U.S. PATENT DOCUMENTS 2,410,595  11/1946  Bacon ................................ 528/389
4,190,460   2/1980  Cassar ............................... 528/389
4,475,953  10/1984  Ludwig .............................. 528/389

Primary Examiner—Christopher Henderson

[57] ABSTRACT

Superior vulcanization agents for rubber are prepared by reacting sulfur with an olefin at 140°–160° C. in an aqueous reaction media in the presence of a basic catalyst and a dispersing agent.

11 Claims, No Drawings

RUBBER VULCANIZATION AGENTS AND METHODS FOR THEIR PREPARATION

TECHNICAL FIELD

This invention relates to vulcanization agents for rubber and a novel method for their preparation. The invention also relates to vulcanizates which comprise a major portion of rubber and a minor proportion of the material prepared in accordance with this invention. More particularly, the invention concerns a novel process for the preparation of a useful rubber curing agent which will provide a rubber having improved physical properties.

BACKGROUND ART

Obtaining a uniform dispersion of elemental sulfur in rubber stocks has been a serious problem for the rubber industry and one which has received a great deal of attention. Problems attributable to poor dispersion of sulfur in the rubber include migration of the sulfur to the surface of the rubber stock commonly referred to as "bloom": decrease of tack at the surface of the rubber stock; variation of the physical properties of vulcanizates from batch to batch; and others.

Compounds containing high sulfur levels can exhibit problems with sulfur bloom on the surface of the unvulcanized rubber. This surface layer of sulfur crystallizes causing a loss of building tack which can cause problems in tire building.

Numerous modifications of standard rubber processing techniques have been utilized to minimize the sulfur bloom tendencies. These prior methodologies include the use of insoluble sulfur in the compound; limiting the compound mixing temperatures during the sulfur addition stage: and minimizing the heat history that the compound is exposed to during processing.

Insoluble sulfur is formed by rapidly quenching molten sulfur that is above 159° C. (preferably 200°-250° C.). This product consists primarily of long chain sulfur molecules and a lesser amount of soluble $S_8$ rings. There is a tendency for the long chain molecules to revert to the more stable soluble form if exposed to higher temperatures, long storage times and/or hostile storage environments.

Commercial insoluble sulfur products contain a stabilizer to reduce this tendency. When insoluble sulfur is mixed in a rubber compound, it exists as more or less discreet particles of varying size in the rubber phase. Above about 118° C. substantial reversion to the soluble sulfur form occurs with resulting sulfur bloom.

An approach taken over the years has been to combine sulfur with an unconjugated diene which is believed to enhance the compatibility with the rubber. The polymeric structure is also believed to improve the stability of the sulfur chains against breakdown to soluble $S_8$ units at normal storage and processing temperatures yet readily allow the release of sulfur for crosslinking at vulcanizing temperatures.

U.K. patent No. 1,232,056 discloses a method of preparing a vulcanizing agent for natural and synthetic rubbers which comprises heating together at a temperature of from 100°-250° C. between 3 and 50 parts by weight of sulfur and one part by weight of a conjugated diolefin in the presence of a catalytic amount of an amine, such as a dimethyl-substituted tertiary amine.

U.S. Pat. No. 2,989,513 discloses a rubber composition comprising natural or synthetic elastomers and from about 1 to 12% by weight based on the weight of said rubber of a curing agent comprising at least one interpolymer of sulfur and an olefinic hydrocarbon selected from styrene, alpha-methylstyrene, butene, isobutylene, diisobutylene, triisobutylene, ethylene and propylene.

U.S. Pat. No. 3,544,492 discloses an improved curing agent which is a resinous composition formed by the reaction of one or more olefinic materials and a s-triazine, substituted with three groups containing activated terminal unsaturation and sulfur.

U.S. Pat. No. 3,264,239 discloses a process and a vulcanizing agent which comprises preparing a mixture of sulfur, linseed oil and dicyclopentadiene, heating the resulting mixture at 125°-135° C. for at least 5 hours to form an interpolymer, and cooling and isolating the interpolymeric product.

U.S. Pat. No. 3,523,926 discloses a vulcanizing agent for rubbers which is prepared by heating conjugated diolefins with sulfur in the presence of catalytic amounts of amines.

U.S. Pat. No. 4,564,670 describes a disperse sulfur product formed by dispersing particulate sulfur in a liquid poly(cis-isoprene) dispersion agent. The product can be formed by simply mixing the liquid poly(cis-isoprene) dispersion agent with a major amount of sulfur until the desired product results.

Canadian Patent No. 965,231 claims a method for improving the dispersibility of insoluble sulfur in rubber which comprises admixing insoluble sulfur containing up to about 70% by weight soluble sulfur with from about 0.3 to 5% by weight based on the total weight of the sulfur of a dispersing aid selected from a specific group of alkyl-phenoxypoly(ethyleneoxy)ethanol compounds.

Japanese Publication No. 57-133135 discloses a rubber composition with improved sulfur bloom characterized by the addition of triisopropanolamine, diisopropanolamine, monoisopropanaolamine or blends thereof to a rubber composition composed of 2 to 10 weight parts of sulfur as a vulcanizing agent blended in 100 parts of rubber selected from natural rubber, synthetic rubber or rubber blended from the two.

From a review of the prior art methodologies for preparing sulfur-olefin adducts, it is quite apparent that the reaction product of sulfur and an olefin results or can result in materials that are viscous liquids or solids. For example, U.S. Pat. No. 3,259,598 teaches that a sulfur, linseed oil, styrene reaction product can be used to vulcanize rubber. The product from this reaction mixture must be pulverized before it can be incorporated into the elastomer due to the physical properties of the sulfur-olefin adduct.

Uniform dispersion of the sulfur in the rubber is a prerequisite for uniform vulcanization and vulcanizates with optimum mechanical properties and many sulfur-olefin vulcanizing compositions of the prior art require that grinding or milling steps be performed on the sulfur-olefin adduct prior to its use in rubber. This problem has been overcome through the instant invention wherein the sulfur-olefin adducts are prepared by reacting sulfur and an olefin at 140°-160° C. with agitation in water which optionally contains a base as a catalyst and a dispersing agent. The prior art does not suggest or disclose a process for the preparation of sulfur-olefin adducts which is characterized as heating sulfur, an olefin, water, base and optionally a dispersing agent to 120°–200° C. with agitation, cooling the reaction mixture and filtering the sulfur/olefin adduct beads.

The water serves as a medium in which the sulfur can melt and react with the olefin in a particle form. When the reaction mixture is cooled, the sulfur/olefin adduct is frozen into a bead form. The water also acts as a heat sink for the exothermic reaction.

DISCLOSURE OF THE INVENTION

There is disclosed a novel vulcanizing agent for natural and synthetic rubbers, said vulcanizing agent is prepared by heating together with agitation at a temperature of from 120°–200° C. between 1 and 50 parts by weight of sulfur and 1 part by weight of an olefin or olefins in an aqueous reaction media in the presence of a basic catalyst and a dispersing agent.

There is further disclosed a process for making a vulcanizing agent which comprises 1) preparing a mixture of water, sulfur and an olefin wherein from 1.0 to 50 parts by weight of sulfur per part by weight of olefin and wherein the weight ratio of olefin plus sulfur to water ranges from 1:2.5 to 1:60, 2) heating the mixture to 120°–200° C. with agitation to form the vulcanizing agent 3) cooling the reaction mixture and isolating the granular vulcanizing agent.

There is also disclosed a method for preparing a bloom resistant vulcanizate which comprises 1) mixing a sulfur curable rubber with from 0.5 to 12% by weight of said rubber of a curing agent prepared by heating a mixture of water, sulfur and an olefin to 120°–200° C. with agitation optionally in the presence of a basic catalyst and a dispersing agent; and then 2) vulcanizing the rubber/curing agent mixture.

There is also disclosed a method for preparing a rubbery vulcanizate comprising A) mixing a major proportion of a rubbery material having available unsaturation selected from the group comprising natural and synthetic polyisoprenes, polybutadienes, polychloroprenes, copolymers of isobutylene and isoprene, copolymers of butadiene-1,3 and styrene, copolymers of butadiene-1,3 and acrylonitrile; with from 0.5 to 12% by weight based on the weight of said rubbery material of an adduct of sulfur and at least one olefinic hydrocarbon selected from the group consisting of styrene, alpha-methylstyrene, butene-1, butene-2, isobutylene, diisobutylene, cyclooctadiene, dicyclopentadiene, cyclopentadiene and propylene; said adduct being prepared by heating a mixture of water, sulfur and olefinic hydrocarbon to 120° C. to 200° C. for 1 to 3 hours with stirring; B) vulcanizing the rubbery material-sulfur adduct mixture.

The rubbers useful as ingredients in the vulcanizates of this invention include rubbery materials having available unsaturation such as natural and synthetic vulcanizable rubbers and rubbery polymers of dienes preferably of open chain conjugated dienes having from 4 to 8 carbon atoms. Specific examples of rubbery materials which may benefit from the sulfur-olefin adduct of this invention are natural rubber, polybutadiene-1,3, polyisoprene, poly-2,3-dimethyl-butadiene-1,3, poly-2-chlorobutadiene-1,3 and the like. Other rubbers useful are the synthetic rubbers such as those obtained from 1,3-dienes by means of polymerization or the rubbery copolymers, terpolymers and the like of these and similar conjugated dienes with each other or with at least one copolymerizable monomer such as isobutylene, styrene, acrylonitrile, methylacrylate, ethylacrylate, methyl methacrylate, 4-vinyl pyridine and the like. The polymeric diene rubbers generally contain at least 50% by weight of the diene and preferably contain from about 55–85% by weight of the diene. However, copolymers, terpolymers and other multicomponent polymers containing as little as 35% or less by weight of diene can also be employed. Still other rubbery materials can be used in the practice of this invention such as unsaturated polymers containing acid groups obtained by the copolymerization of a major amount of a conjugated diene with an olefinically unsaturated carboxylic acid. Still other rubbers can be employed such as those formed by the copolymerization of dienes with alkyl acrylates and by the polymerization of an alkyl acrylate with at least one other unsaturated monomer followed by hydrolysis. Rubbery polyesterurethanes, polyetherurethanes and polyesteramideurethanes having curable double bonds or available unsaturation and rubber reclaimed from the foregoing can also be used. Mixtures of two or more of the foregoing rubbers may be employed as ingredients in the vulcanizates of this invention. The preferred rubbers are the natural and synthetic polyisoprenes, the polybutadienes, the polychloroprenes, the copolymers of isobutylene with isoprene, butadiene-1,3 with styrene, and butadiene-1,3 with acrylonitrile.

The novel sulfur-olefin adducts produced according to the present invention comprise adducts of sulfur and one or more olefinic compounds. Specific olefinic compounds which are useful in the present invention include but are not limited to olefinic hydrocarbons such as ethylene, propylene, butene, isobutylene isopentene, diisobutylene, triisobutylene, hexyl-2-decene-1, and heptadecene-7: cycloalkenes such as cyclopentene and cyclohexene: unsaturated terpenes such as pinene, camphene, and myrcene: aralkenes such as styrene, dihydronaphthalene, indene, alpha-methyl styrene and polyolefins such as butadiene, isoprene, chloroprene, cyclopentadiene, dicyclopentadiene, cyclohexadiene, vinyl cyclohexene, 1,7-octadiene, cyclooctadiene and the like. The preferred olefinic compounds are styrene, alpha-methyl styrene, cyclopentadiene and dicyclopentadiene.

Elemental sulfur is used in preparing the sulfur-olefin adduct curing agents of this invention.

A catalyst may be employed to facilitate the formation of the sulfur-olefin adduct although they are not necessary. Representative of the basic materials which may be used to catalyze the formation of the sulfur-olefin adduct include calcium carbonate, sodium carbonate, sodium hydroxide, tetramethylethylene diamine and the like.

Representative of the dispersing agents that may be used in the preparation of the sulfur-olefin adduct include polyethylene oxides, carboxymethyl cellulose, polyvinylalcohol, and the like.

The reaction to form the sulfur-olefin adduct is advantageously and necessarily carried out in water to accomplish the benefits of the instant invention.

The weight ratio of water to sulfur plus olefin can vary from 2.5:1 to 60:1. Preferably the ratio is 7:1 to 4:1 with 5:1 being most preferred. The weight ratio of sulfur to olefin can vary from 1:1 to 50:1, with 6:1 being preferred.

The sulfur-olefin adduct curing agents of this invention are prepared at temperatures in the range of from 120° C. to 200° C. and preferably from 140°–160° C. Most preferably, the reaction is conducted at least 150° C. At temperatures below 145° C., the beads after isolation will agglomerate unless a cross-linkable monomer such as divinylbenzene is used in conjunction with a peroxide in the reaction mixture. The reaction, since it is conducted above the boiling point of water, is necessarily conducted in a closed vessel such as an autoclave.

The vulcanizates of this invention comprise as essential ingredients a major proportion of a single rubbery material or a mixture of two or more rubbery materials and a minor proportion of a single or a mixture of sulfur-olefin adduct curing agents. Other appropriate compounding ingredients such as reinforcing agents, fillers, accelerators, plasticizers, antioxidants, age resistors, resins, dyes, color pigments and the like may be employed with the rubbery compositions disclosed herein in the amounts customarily employed in the rubber industry.

The sulfur-olefin curing agent of this invention is useful in the range of from about 0.5 to about 12 parts by weight per 100 parts by weight of the rubbery material to be vulcanized. The preferred range is from about 1 to about 5 parts by weight per 100 parts of rubbery material. The rubber stocks containing the curing agent and other appropriate compounding ingredients can be mixed on a mill or other suitable mixing device such as a Banbury and the resulting blend can be cured at temperatures of from about 120° C. to about 180° C. and preferably at from about 130°-160° C.

The vulcanizates of the present invention are useful in tire treads, tire sidewalls, carcass stocks, V-belts, gloves, shoe heels, shoe soles, printing rollers, colored rubber articles and wherever it is desired to provide a stable elastomer that does not exhibit sulfur bloom.

In the following illustrative examples, the amounts of ingredients are given in parts by weight unless otherwise specified.

Prior Art Process

Comparative Example 1—Reaction of DCPD with Sulfur

Into a 500 ml flask equipped with a temperature controller, nitrogen inlet tube and mechanical stirrer were placed 225 g of sulfur, 75 g of dicyclopentadiene (DCPD) and 3 g of N,N,N$^1$,N$^1$-tetramethylethylene diamine (TMEDA). The flask was flushed with nitrogen and the mixture was heated to 140° C. Stirring was started when the sulfur had melted. The reaction exothermed to 165° C. and became too viscous to stir in 25 minutes. The product solidified at 165° C. and upon cooling resembled concrete.

COMPARATIVE EXAMPLE 2

Into a 500 ml flask equipped with a temperature controller, nitrogen inlet tube and mechanical stirrer were placed 270 g of sulfur, 30 g of DCPD and 0.6 g of TMEDA. The flask was flushed with nitrogen and the mixture was heated to 140° C. for 45 minutes. The hot product was poured into an aluminum pan where it eventually solidified. The reaction flask was discarded because of the difficulty involved in cleaning off the product.

PROCESS OF THE INVENTION

EXAMPLE 1

Into a one liter autoclave were placed 75 g of sulfur, 25 g of DCPD, 500 ml of water, 10 g of calcium carbonate as a catalyst, and 6.5 g of carboxymethyl cellulose as a dispersing agent. The autoclave was flushed with nitrogen and heated to 140° C. for three hours with stirring. The autoclave was cooled to 13° C. and small brown beads of product were filtered from the water. Differential scanning calorimetry showed that a reaction had occurred between the sulfur and the olefin.

EXAMPLE 2

Into a 4 liter autoclave were placed 425 g of sulfur, 75 g of DCPD, 2500 ml of water, 20 g of calcium carbonate as a catalyst and 32 g of carboxymethyl cellulose as a dispersing agent. The autoclave was flushed with nitrogen and heated to 150° C. for three hours with stirring. After cooling to room temperature, small beads of brown product were filtered from the water. Differential scanning calorimetry indicated that a reaction had occurred.

EXAMPLE 3

Into a 4 liter autoclave were placed 425 g of sulfur, 75 g of alpha-methylstyrene, 2500 ml of water, 20 g of calcium carbonate as a catalyst and 32 g of carboxymethyl cellulose as a dispersing agent. The autoclave was flushed with nitrogen and heated to 150° C. for three hours with stirring. After cooling to room temperature, the product was isolated as an orange powder.

EXAMPLE 4

1.0 g of polyvinylalcohol (Vinol ® 203 from Air Products) was dissolved in 2500 ml of water. This solution was added to a 4 liter reactor with 425 g of sulfur, 75 g of DCPD, and 20 g of calcium carbonate. The reactor was sealed and heated with stirring to 150° C. for three hours. After cooling to room temperature, the small beads of sulfur/DCPD adduct were filtered.

EXAMPLE 5

Into a 4 liter autoclave were placed 425 g of sulfur, 75 g of DCPD, 2500 ml of water, 20 g of calcium carbonate and 5.0 g of Igepal ®-630 (GAF). The reactor was sealed and heated to 150° C. for three hours with stirring. After cooling to room temperature, the sulfur/DCPD adduct was isolated as small ribbons.

EXAMPLE 6

No Dispersing Agent

Into a 4 liter autoclave were placed 425 g of sulfur, 75 g of DCPD, 2500 ml of water and 20 g of calcium carbonate. The reactor was then sealed and heated to 150° C. for three hours with stirring. After cooling to ambient temperature, the sulfur/DCPD adduct was isolated as small beads.

EXAMPLE 7

Peroxide and Divinylbenzene

Into a 4 liter autoclave were placed 425 g sulfur, 50 g DCPD, 20 g styrene, 5 g divinylbenzene, 2500 ml of water, 20 g CaCo$_3$, 32 g carboxymethyl cellulose and 7.1 g of a 70% solution of t-butylhydroperoxide in water. The reactor was sealed and heated to 140° C. for three hours. After cooling to ambient temperature, the sulfur/olefin adduct was isolated as beads.

EXAMPLE 8

No Catalyst

Into a 4 liter autoclave were placed 425 g sulfur, 75 g DCPD, 2500 g water and 32 g carboxymethyl cellulose. The autoclave was sealed and heated to 150° C. for three hours with stirring. After cooling to ambient temperature, the sulfur/olefin adduct was isolated as beads.

EXAMPLE 9

Into a 4 liter autoclave were charged 1800 g of water, 478 g of sulfur, 84 g DCPD, 36 g of carboxymethyl cellulose and 15 g of calcium carbonate. The reactor was sealed and heated to 150° C. for 3 hours with stirring. After cooling to room temperature, beads of sulfur/olefin adduct were isolated.

EXAMPLE 10

Into a 4 liter autoclave were charged 425 g of sulfur, 75 g DCPD, 2500 ml of water, 20 g of calcium carbonate and 32 g of carboxymethyl cellulose. The reactor was sealed and heated to 150° C. for three hours with stirring. After cooling to ambient temperature, the beads were filtered.

EXAMPLE 11

Into a 4 liter autoclave were charged 425 g sulfur, 60 g of DCPD, 15 g styrene, 2500 ml of water, 20 g of calcium carbonate and 32 g of carboxymethyl cellulose. The reactor was sealed and heated to 150° C. for three hours with stirring. After cooling to ambient temperature, the beads were filtered.

The ability of the sulfur-olefin adduct prepared according to Examples 10 and 11 to cure rubbers was compared with that of insoluble sulfur using a prepared unvulcanized blend of natural and synthetic polyisoprene rubber.

Two rubber stocks were prepared by employing the following recipe set out in Table I. All parts are parts by weight.

TABLE I

| Component | Control | Experimental |
|---|---|---|
| Polyisoprene/Natural Rubber (Non-productive) | 176.05 | 176.05 |
| Hexamethoxy methyl-melamine | 2.80 | 2.80 |
| Retarder | 0.10 | 0.10 |
| Antioxidant | 0.75 | 0.75 |
| Zinc Oxide | 3.00 | 3.00 |
| Accelerator | 0.60 | 0.60 |
| Secondary Accelerator | 0.60 | 0.60 |
| Insoluble Sulfur | 3.00 | -0- |
| Sulfur-Olefin Adduct from Example 10/11 | -0- | 2.83 |

The components were mixed in a Banbury. The quantities and materials used were those typically used in the art for producing vulcanized rubber. The amount of sulfur-olefin adduct used was such that its available sulfur was substantially equivalent in weight to the weight of sulfur used in the control. The Banbury mix time required to incorporate the sulfur-olefin adduct was similar to that required to incorporate the insoluble sulfur therein.

As an additional comparative, a commercially available sulfur-olefin adduct obtained from Wyrough and Loser, Inc. known as Thio-Cure-BR was used in place of the insoluble sulfur and the adducts from Examples 10 and 11; however, at a level of 3.0 instead of 2.83.

The vulcanizable compositions were pressed out and cured in a rubber press for about 40 minutes at 150° C. to provide cured slabs for testing. The physical properties for the controls and the experimental samples are set out in Table II.

A critical factor in the utility of rubber chemicals is how well they can be dispersed into the rubber. Clearly, if the chemicals are not well dispersed, they cannot fully take part in the cure. It has been found, through a dispersion test, that the sulfur/DCPD/styrene adduct prepared according to this invention is dispersed into rubber better than a sulfur/DCPD adduct. The test consists of mixing the material into the rubber using a Banbury, sheeting the rubber out on a mill and visually observing unbroken beads in a standard size area. The dispersion values ranged from 0-5 with 0 being complete dispersion and 5 being the poorest dispersion. The dispersion values for the controls and Examples 10 and 11 in Table II were control —0, sulfur/DCPD —4, sulfur/DCPD/styrene —0, Thio-Cure BR —5. The test demonstrates that the sulfur curatives prepared according to the instant invention, when DCPD and styrene are used as the olefins, had comparable dispersion ability to insoluble sulfur and much better dispersability than the commercially available Thio-Cure.

The data indicates that the sulfur-olefin adduct prepared according to this invention had better scorch delay than the control but cured at a slower rate. In addition, the curative from Examples 10 and 11 reached a much higher state of cure than the commercially available Thio-Cure-BR.

It was further found that the vulcanizable compositions containing the sulfur-olefin adducts prepared according to this invention had bloom resistance similar to compositions made with insoluble sulfur.

From the studies conducted on the sulfur-olefin adducts prepared according to this invention, it was demonstrated that elastomers cured with the product of this invention exhibited much less bloom than orthorhombic sulfur and equivalent bloom to insoluble sulfur.

Industrial Applicability

The above Examples clearly demonstrate the utility of the sulfur-olefin curing agents of the present invention. These curing agents can be employed in a wide variety of rubber stocks and the resulting vulcanizates have physical properties comparable to those achieved with a conventional sulfur cure but with none of the attended disadvantages related to bloom. The sulfur-olefin adduct curing agents thus offer improved results over presently known commercial sulfur containing curing agents.

It is, of course, to be understood that the foregoing examples are intended to be illustrative only and that numerous changes can be made in the ingredients, proportions and conditions specifically disclosed therein without departing from the spirit of the invention as defined in the appended claims.

TABLE II

| | Physical Properties | | | |
|---|---|---|---|---|
| | Example 10 | Example 11 | Control | Thio-Cure |
| Rheometer, 300 F, 3 Deg. Arc, 100 CPM, 60 Min. Motor | | | | |
| Torque, Min. | 15.7 | 15.8 | 15.0 | 15.6 |
| Torque, Max. | 74.1 | 75.0 | 82.7 | 61.6 |
| TS 2 | 4.2 | 4.4 | 3.7 | 4.4 |
| T'C25 | 8.3 | 8.0 | 6.3 | 9.1 |
| T'C90 | 21.7 | 21.0 | 21.2 | 28.8 |
| Scorch, MS/250 F | | | | |
| Minimum | 33. | 33. | 32. | 34. |
| T5 | 18.3 | 19.6 | 16.8 | 20.2 |
| Specific Gravity | 1.167 | 1.169 | 1.169 | 1.168 |

TABLE II-continued

|  | Physical Properties | | | |
| --- | --- | --- | --- | --- |
|  | Example 10 | Example 11 | Control | Thio-Cure |
| Autographic Tensile |  |  |  |  |
| Tensile, psi | 2750. | 2925. | 3125. | 1925. |
| Elongation, % | 390. | 420. | 410. | 320. |
| 300% Modulus | 2100. | 2050. | 2275. | 1750. |
| Hardness, Shore A | 81. | 81. | 81. | 78. |
| Best Cure, Min. @ 300 F | 40. | 40. | 40. | 45. |
| Air Bomb Aging - 16 hrs./250 F/80 psi |  |  |  |  |
| Tensile, psi | 600. | 475. | 750. | 250. |
| % Change | −78. | −84. | −76. | −87. |
| Elongation, % | 160. | 60. | 170. | 90. |
| % Change | −59. | −86. | −59. | −72. |
| Hardness, Shore A | 81. | 85. | 82. | 76. |
| Point Change | 0. | 4. | 1. | −2. |

We claim:

1. A process for the preparation of a granular vulcanizing agent for natural and synthetic rubbers which comprises: (1) admiximg sulfur, at least one olefin, water and a dispersing agent at weight ratios of sulfur to olefin of from 1:1 to 50:1, and weight ratios of water to sulfur plus olefin of from 2.5:2 to 60:1 (2) heat the mixture to 120° to 200° C. with agitation for a sufficient time to form the granular vulcanizing agent; (3) cooling and isolating the granular vulcanizing agent.

2. A process for making a vulcanizing agent which comprises (1) preparing a mixture of water, sulfur and an olefin wherein from 1 to 50 parts by weight of sulfur per part by weight of olefin and wherein the weight ratio of olefin plus sulfur to water ranges from 1:2.5 to 1:60; (2) heating the mixture to 120°–200 C. with agitation to form the vulcanizing agent; (3) cooling and isolating the granular vulcanizing agent.

3. The process according to claim 1 wherein the olefins are selected from dicyclopentadiene and styrene.

4. The process according to claim 2 wherein the olefin is a mixture of dicyclopentadiene and styrene.

5. The process according to claim 1 wherein the basic catalyst is selected from the group comprising calcium carbonate, sodium carbonate, sodium hydroxide and tetramethylethylene diamine; and wherein the dispersing agent is selected from the group comprising polyethylene oxides, carboxymethyl cellulose, and polyvinylalcohol.

6. A process for the preparation of a granular vulcanizing agent for natural and synthetic rubbers which comprises: (1) admixing sulfur, at least one olefin, water, a dispersing agent and a basic catalyst wherein the weight ratio of sulfur to olefin is from 1:1 to 50:1 and the weight ratio of water to sulfur plus olefin is from 2.5:1 to 60:1; (2) heat the mixture to 120° to 200° C. with agitation for a sufficient time to form the granular vulcanizing agent; (3) cooling and isolating the granular vulcanizing agent.

7. A process according to claim 1 wherein the olefin is a mixture of dicyclopentadiene and styrene.

8. A process according to claim 1 wherein the weight ratio of sulfur to olefin can range from 3:1 to 6:1.

9. A process according to claim 1 wherein the weight ratio of water to sulfur plus olefin can range from 7:1 to 4:1.

10. A process according to claim 1 wherein the reaction micture is heated to 145° to 155° C. for at least 2 hours.

11. A process for the preparation of a granular vulcanizing agent according to claim 6 wherein the olefin is a mixture of dicyclopentadiene and styrene at a weight ratio of dicyclopentadiene to styrene of 4:1; wherein the weight ratio of sulfur to olefin is at least 5:1; wherein the weight ratio of water to sulfur plus olefin is at least 5:1; and wherein the basic catalyst is calcium carbonate and the dispersing agent is carboxymethyl cellulose.

* * * * *